(12) United States Patent
Thöny

(10) Patent No.: US 11,878,624 B2
(45) Date of Patent: Jan. 23, 2024

(54) SNOW VEHICLE

(71) Applicant: PRINOTH AG, Sterzing (IT)

(72) Inventor: Manfred Thöny, St. Gallenkirch (AT)

(73) Assignee: PRINOTH AG, Sterzing (IT)

(*) Notice: Subject to any disclaimer, the term of this patent is extended or adjusted under 35 U.S.C. 154(b) by 439 days.

(21) Appl. No.: 16/954,477

(22) PCT Filed: Dec. 19, 2018

(86) PCT No.: PCT/EP2018/085789
§ 371 (c)(1),
(2) Date: Jun. 16, 2020

(87) PCT Pub. No.: WO2019/121880
PCT Pub. Date: Jun. 27, 2019

(65) Prior Publication Data
US 2021/0072020 A1 Mar. 11, 2021

(30) Foreign Application Priority Data
Dec. 20, 2017 (AT) .................................. A 494/2017

(51) Int. Cl.
*B60Q 1/08* (2006.01)
*H05B 47/105* (2020.01)
(Continued)

(52) U.S. Cl.
CPC ............... *B60Q 1/085* (2013.01); *B60Q 1/24* (2013.01); *B60Q 9/008* (2013.01); *G06V 10/145* (2022.01);
(Continued)

(58) Field of Classification Search
CPC .... G01B 11/2513; G01B 11/25; B60Q 9/008; B60Q 2300/32; B60Q 2400/50;
(Continued)

(56) References Cited

U.S. PATENT DOCUMENTS 9,855,887 B1 * 1/2018 Potter .................. F21S 41/675
2013/0243247 A1 9/2013 Sakaue et al.
(Continued)

FOREIGN PATENT DOCUMENTS

DE       101 54 635       5/2003
DE   10 2011 089836       6/2013
(Continued)

OTHER PUBLICATIONS

Notification Concerning Submission, Obtention or Transmittal of Priority Document for International Application No. PCT/EP2018/085789 dated Jan. 23, 2019.
(Continued)

*Primary Examiner* — Renan Luque
(74) *Attorney, Agent, or Firm* — Neal, Gerber & Eisenberg LLP

(57) ABSTRACT

The disclosure relates to a snow vehicle having at least one lighting element for orientation in the surroundings of the vehicle and for optical detection of obstacles and topographical conditions of the surroundings, wherein the lighting element is a laser having at least one laser beam, which projects a pattern having a structure on the ground of the surroundings, said pattern being distorted in a visually recognizable manner on the obstacle to be detected or on the topographical conditions.

22 Claims, 8 Drawing Sheets

(51) Int. Cl.
    *B60Q 9/00* (2006.01)
    *G06V 10/145* (2022.01)
    *G06V 20/58* (2022.01)
    *B60Q 1/24* (2006.01)
    *E01H 4/02* (2006.01)

(52) U.S. Cl.
    CPC .......... *G06V 20/58* (2022.01); *H05B 47/105* (2020.01); *B60Q 2300/32* (2013.01); *B60Q 2400/50* (2013.01); *E01H 4/02* (2013.01)

(58) Field of Classification Search
    CPC ...... B60Q 2800/20; B60Q 1/24; B60Q 1/085; B60Q 1/08; E01H 4/02; G06V 10/145; G06V 20/58; G08G 1/165; G08G 1/16
    See application file for complete search history.

(56) References Cited

U.S. PATENT DOCUMENTS

| | | | | |
|---|---|---|---|---|
| 2015/0308645 | A1* | 10/2015 | Ishikawa | G01C 9/02 73/431 |
| 2016/0318423 | A1* | 11/2016 | Thibault | B60N 2/06 |
| 2019/0003136 | A1* | 1/2019 | Kimura | B60Q 1/24 |

FOREIGN PATENT DOCUMENTS

| | | | | |
|---|---|---|---|---|
| DE | 20 2013 006071 | | 9/2013 | |
| DE | 10 2015 200748 | | 7/2016 | |
| DE | 202016004062 | U1 * | 9/2016 | |
| EP | 3 118 515 | | 1/2017 | |
| GB | 2507352 | A * | 4/2014 | .............. B60Q 7/00 |
| JP | 2003231438 | A | 8/2003 | |
| JP | 2005157873 | A | 6/2005 | |
| JP | 2008114714 | A | 5/2008 | |
| JP | 2013058374 | A | 3/2013 | |
| JP | 2013191858 | A | 9/2013 | |
| JP | 2015155270 | A | 8/2015 | |
| WO | WO 01/16560 | A2 | 3/2001 | |

OTHER PUBLICATIONS

International Search Report and Written Opinion for International Application No. PCT/EP2018/085789 dated Mar. 14, 2019.

Office Action and Search Report for Japanese Application No. 2020-554574 with translation dated Dec. 22, 2022 (12 pages).

Office Action and Search Report for Chinese Application No. 2018800833454 with translation dated Feb. 15, 2023 (21 pages).

* cited by examiner

SNOW VEHICLE

PRIORITY CLAIM

This application is a national stage application of PCT/EP2018/085789, filed on Dec. 19, 2018, which claims the benefit of and priority to Austrian Patent Application No. A494/2017, filed on Dec. 20, 2017, the entire contents of which are each incorporated by reference herein.

TECHNICAL FIELD

The disclosure refers to a snow vehicle with at least one lighting element for orientation in the surroundings of the snow vehicle and for optical detection of obstacles and topographical conditions of the surroundings.

BACKGROUND

A snow vehicle can operate, for example, as a snow groomer for the maintenance of ski slopes and cross-country ski trail, as well as a transport vehicle for the transportation of goods and people on snow-covered ground.

For orientation in snow-covered surroundings at night, such a vehicle has at least one headlight that illuminates the surroundings and enables the driver to detect obstacles. For example, snow groomers intended for the maintenance of ski slopes may have additional headlights on the driver's cabin to illuminate the area surrounding the ski slope to be maintained at night.

German Patent No. DE 10 2011 089 836 A1 shows a snow groomer for treating and modelling snow surfaces, with at least two headlights located in recesses of a front cover.

A disadvantage of this lighting is that the surrounding ground becomes blurred with the sky and obstacles are relatively difficult or impossible to detect, especially during relatively harsh weather conditions. Even during the daytime, the driver experiences difficulties orienting himself or herself in the surroundings during harsh weather conditions.

An example of this is the so-called whiteout effect: this refers to the appearance of diffused luminosity that produces scattered sunlight when the ground is covered in snow (due to clouds, fog, or snowfall). The relatively strong scattered reflection of sunlight and the relatively extremely high minimum luminance causes a stark reduction in contrast and the entire field of vision appears to be uniformly bright. This results in the disappearance of the horizon, whereby ground and sky merge seamlessly. Even contours or shadows are no longer visible and the observer has the feeling of being in a completely empty, infinite grey space.

Whiteouts are a considerable factor of risk in a skiing area: in areas subject to the risk of falls, obstacles or abysses can no longer be recognised. Distances and the steepness of the ground cannot be detected.

Even if the vehicle's lighting system is operational at close range, conventional lighting produces only a two-dimensional light, which means that obstacles can only be detected late—or not at all.

German Patent No. DE 101 54 635 A1 shows a tillage machine with a sensor device by means of which an area of the soil to be tilled can be scanned in the direction of movement and a signal is generated to adjust the height of the tillage tool, which can be a blade, for example. For this purpose, the sensor configuration comprises a laser transmitter and receiver which emits light beams and analyses the beams reflected from the ground in the receiver in terms of runtime and amplitude to control the tillage tool. A disadvantage of this device is that the sensor configuration is relatively complex and extremely susceptible to weather conditions. In addition, even if the tillage tool enters into operation, the driver still does not know whether he or she is heading for an obstacle, which is why a evasive maneuver cannot be timely performed.

SUMMARY

The object of the present disclosure is therefore to improve the illumination of such a snow vehicle so that obstacles and topographical conditions near the vehicle can relatively easily be detected.

In certain embodiments, a feature of the snow vehicle includes the lighting element for orientation in the surroundings of the snow vehicle, said lighting element being a laser with at least one laser beam, which projects a pattern with a structure onto the surrounding ground, said pattern being distorted in a visually recognizable manner on the obstacle to be detected or the topographical condition.

By using a laser that projects a defined pattern onto the ground, with at least one relatively sharply focusable laser beam, the driver of the vehicle is therefore able to visibly recognize the surroundings in relation to the object. This object-related recognition enables for the recording of topographic surface characteristics of the surroundings. The presence of an obstacle can be inferred from a deviating displacement or curvature of the image of the beam pattern.

Such a laser beam can advantageously be projected over a relatively longer distance, whereby such a long distance can be for example, between 6 meters and 25 meters in front of the snow vehicle.

The primary laser that emits the laser beam is equipped with special optics that optically transform the laser beam so that it creates a specific structure, from its mounted position on the snow vehicle, directed towards the ground, whereby, in certain embodiments, a specially made cut for the lens is used. The wave structure of light enables the finest microstructures to deflect the light.

The laser beam is optically transformed by such a lens in a way that it creates the pattern with a defined structure when it is directed towards the ground from its mounted position on the snow vehicle.

In alternative embodiments, a laser beam can be directed onto the ground by, for example, a rotating mirror element or a movable optical element.

In certain embodiments, the lasers used on the snow vehicle can be extended and retracted by a telescopic arm. The telescopic arm can, for example, be controlled electrically or by an electric motorized actuator.

In various embodiments, the laser according to the disclosure projects an accurate light pattern onto the ground, which can be visually interpreted by the driver of the vehicle. Three-dimensional objects can therefore be made visible based on a light grid generated by the laser and projected onto the ground. It should be appreciated the present disclosure is not limited to these embodiments.

In addition to a light grid or cross-shaped grid, other structures can also be generated by the laser, such as for example point structures, circular structures, multiple lines, or circles.

These structures can be used to detect the depth and/or shape of obstacles or topographical conditions of the surroundings.

In a development of the present disclosure, the laser used is self-levelling (i.e., the laser lines are always 100 percent straight) meaning that the lens compensates the inclined position, when the snow vehicle is in an inclined position.

In another embodiment of the disclosure, the laser control system includes a lens which enables the laser to be oriented in a relatively extremely precise manner (north, west, south, east). The gyroscope sensor allows to accurately identify changes in direction. When this information is combined with the measurement of distances, this can be used to determine the current location. For example, if the snow vehicle is driving in a valley with no available GPS, the gyroscope turns on and provides the missing information.

Such a sensor can detect the tilt or inclination of the snow vehicle and take appropriate countermeasures via the laser control. In this way, the light pattern on the ground always outlines the desired structure.

If a vehicle heads towards an uneven object in the landscape or an object such as a tree stump, the cross grid projected onto the ground by the laser is defined in three dimensions. This results in a spatial deformation of the laser grid lines, which change in terms of the distance between each other or are bent. This enables to ultimately infer the type of object set in front of the snow vehicle, as well as the object dimensions.

Surface geometries can be distinguished and identified with the laser according to the disclosure. It should thus be appreciated that according to the state of the art, such object recognition would not be possible with a diffuse incident light, such as that emitted by a halogen headlamp.

In certain embodiments, a red laser light is employed, as this suppresses the ambient light and the laser lines are more visible. It should however be appreciated that the disclosure is not limited to this, as the use of a different colour scheme for the laser, such as green or blue, may also be employed in association with the present disclosure. Such a colour can be produced, for example, by upstream colour filters.

The structure projected onto the ground moves together with the snow vehicle in the direction of movement; it is nevertheless slower than the vehicle, creating the effect that the vehicle moves over the pattern. The advantage of moving over the pattern, besides providing relatively better orientation, among other things, is that the displayed pattern does not flicker and thus avoids the driver getting distracted by such a flicker.

The laser projection on the ground is controlled depending on the driving speed v, the steering angle φ and the selected gear G, as well as by inertial sensors which detect the inclination of the snow vehicle on the terrain. This allows to react to the steering angle so that the laser always shines in the direction of movement.

If the driver changes to reverse gear, for example, at least one laser on the rear of the snow vehicle is switched on and the surface of the rear surrounding is illuminated. Irrespective of this, it is also possible for the driver of the snow vehicle to manually determine which area in the immediate surroundings of the snow vehicle should be covered.

In a further development of the disclosure, at least one side laser is placed on the side of the driver's cab. This side laser can also be used to project a grid-like pattern onto the ground. It should however be appreciated that the disclosure is not limited to this as, for example, a circular structure can also be projected onto the ground from the laser. Depending on the size of the circle, the driver can infer the distance to an object. If the driver steers along the edge of a forest, for example, the circle projected onto the trees is smaller than if the laser beam is emitted onto an open area.

Any information and features disclosed in the documents, including those disclosed in the summary, and, in particular, the spatial arrangement outlined in the drawings, are claimed to be essentially inventive to the extent that they are—on an individual basis or in combination—new compared to the state of the art. The disclosure is explained in greater detail below, with drawings showing several embodiments. The drawings and their descriptions exhibit additional essential features and advantages of the disclosure. Additionally, it should be appreciated that in those instances where individual items are designated as "essential for the disclosure" or "important", this does not imply that these items must necessarily be the subject of an independent claim. This is determined solely by the currently valid version of the independent patent claim.

BRIEF DESCRIPTION OF THE DRAWINGS

Further features and advantages of the present disclosure will be apparent from the following description of a non-limiting embodiment thereof, with reference to the figures of the accompanying drawings, wherein.

DETAILED DESCRIPTION

Figure 1:
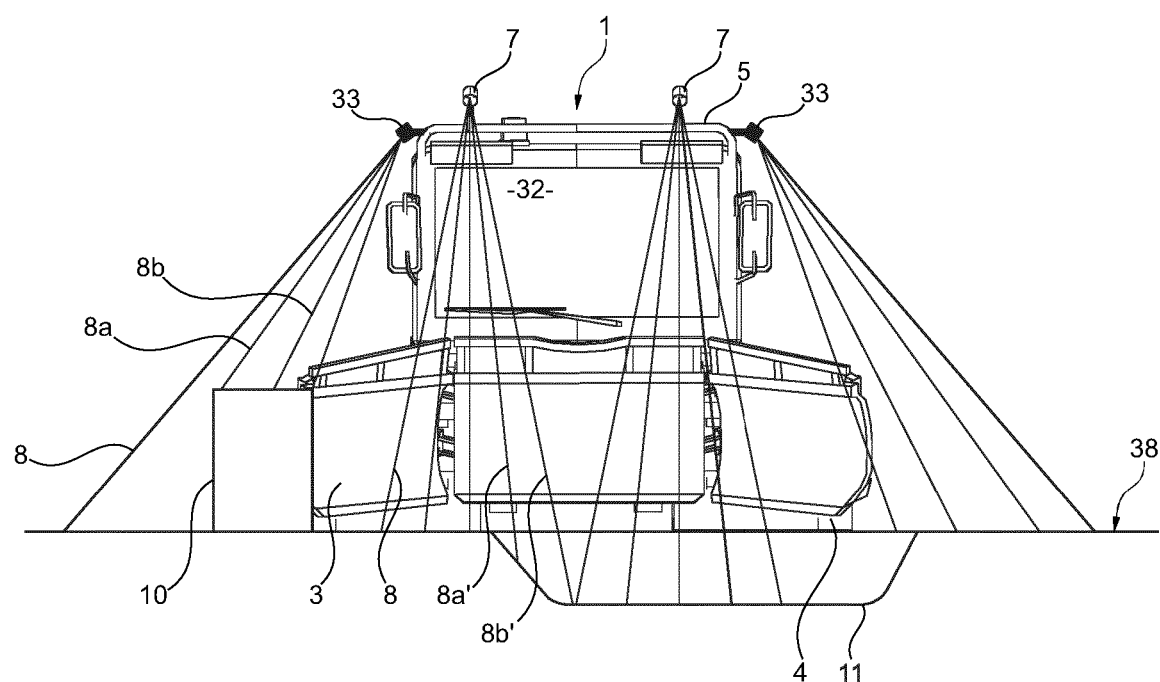
FIG. 1 is a front view of an example snow vehicle of one embodiment of the present disclosure.

FIG. 1 shows a snow vehicle 1, which can move on two undercarriages 4 that can be controlled independently of each other on the ground 38 of the surrounding area 9.

The snow vehicle 1 includes a driver's cab 5, with room for at least one driver who steers the snow vehicle 1. The driver's cab 5 has a windscreen 32 through which the driver can monitor the surroundings 9. In this embodiment example, two lasers 7, which emit laser beams 8 in the direction of movement of the snow vehicle 1, are placed above the driver's cab 5, as well as two side lasers 33, which emit the laser beams towards the side of the snow vehicle and onto the ground 38. The laser beams 8 are thus projected onto a defined area of the ground 38.

When the snow vehicle 1 approaches an object in the direction of movement, shown here as tree stump 10, the laser beams 8 illuminate this object and, as a result of the short distance of the laser beams when it hits the object, the laser beams 8, which previously shone on the ground 38, are no longer as long as they were before, and now form the beams 8a, 8b. Depending on the distance of the laser 33 from the tree stump 10, the laser beams 8a, 8b are of different lengths and shorter than the laser beams 8, which continue to beam unobstructed onto the ground 38. Such a difference between the individual laser beams 8, 8a, 8b enables the driver of the snow vehicle to visually distinguish this, so the driver can detect the object in the direction of movement and, if necessary, perform an evasive maneuver.

When the snow vehicle 1 reaches the trench 11, the laser beams 8 from laser 7 illuminate this obstacle. As a result of the extended distance of the laser beams shining through the object, the length of the laser beams 8, which previously shone on the ground 38, is also extended and now forms the beams 8a', 8b'. Depending on the distance of the laser 7 from the area of the trench 11, the laser beams 8a', 8b' are of different lengths and longer than the laser beams 8, which continue to beam unobstructed onto the trench 11. Such a difference between the individual laser beams 8, 8a', 8b' enables the driver of the snow vehicle to visually distinguish this, so that the driver can detect the object in the direction of movement and, if necessary, perform an evasive maneuver or perform maintenance on the ground 38 at this point. This enables the driver to detect an obstacle or a topographical change on the ground from a spatial deformation of the projected laser beams.

Figure 2:
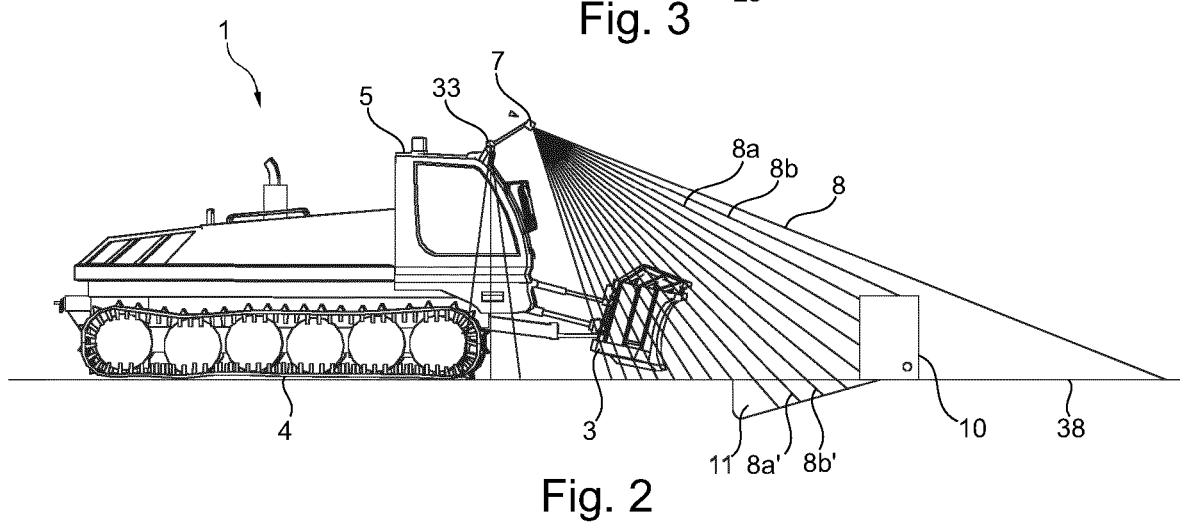
FIG. 2 is a side view of the example snow vehicle of the embodiment of the present disclosure.

FIG. 2 displays a side view of the snow vehicle 1 from FIG. 1, the laser beams 8 emitted from laser 7 being projected as a cone of light onto the ground 38. The snow vehicle 1 has a blade 3 on the front end configured to remove the snow, which enables to level the uneven surface of the ground 38. In addition to the laser 7, which lights up in the direction of movement, at least one side laser 33 is also attached to the side of the driver's cab 5, this side laser 33 illuminating the surroundings next to the snow vehicle.

Figure 3:
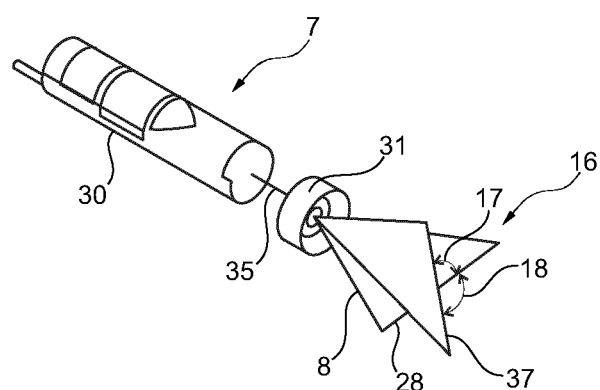
FIG. 3 is a perspective view of an example laser of one embodiment of the present disclosure.

FIG. 3 shows the laser 7 (or 33) used, which emits a primary laser beam 35 from a primary body 30. The primary laser beam 35 passes through the lens 31, wherein the lens 31 shapes the laser light so that the laser beam generates a cross-shaped structure 16. This cross-shaped structure 16 consists of two intersecting, fan-shaped laser beams, which are at an angle 17, 18 to each other. In the example shown here, both angles 17, 18 are ninety degrees, so that two axes at right angles are emitted.

Figure 4:
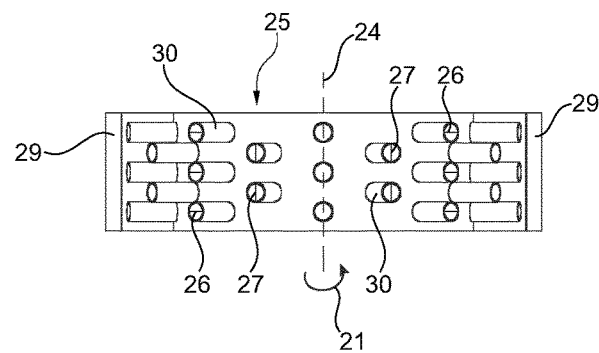
FIG. 4 is a side view of a first variant of an example rotating laser of one embodiment of the present disclosure.

FIG. 4 shows another embodiment of the present disclosure, this time using a drum body 25, which rotates around the axis of rotation 24 in the direction of arrow 21. Primary lasers 30 are mounted at specific distances on the drum body 25, which lasers emit the laser beams through different lenses 26, 27. In the example shown here in FIG. 4, the lenses 26 emit a horizontal line pattern, while the lenses 27 emit a vertical line pattern. If a laser beams passes through these lenses, these project it horizontally or vertically, depending on the lens 26, 27.

Since this is a rotating drum body, panels 29 are attached to the outer circumference of the drum body 25 to protect the driver of the snow vehicle and to enable orientation in the area to be exposed to the beams. The panels 29 also have a protective effect against snow and icing.

Figure 5:
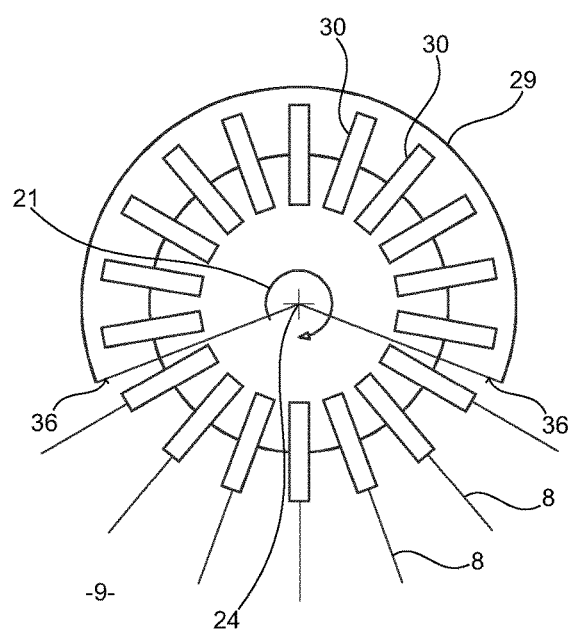
FIG. 5 is a top view of the first variant of the example rotating laser of one embodiment of the present disclosure.

FIG. 5 shows a top view of the drum body 25. The panel 29 does not enclose the drum body 25 by 360° degrees but has an opening 36 which can be emitted onto the surroundings 9 by the laser beams 8.

In a further development of the disclosure, according to FIGS. 4 and 5, the individual primary lasers 30 can be controlled by sliding contacts: in this way, the rotating lasers can emit a beam 8 only when they take on a specific position and are inactive without contact.

Figure 6:
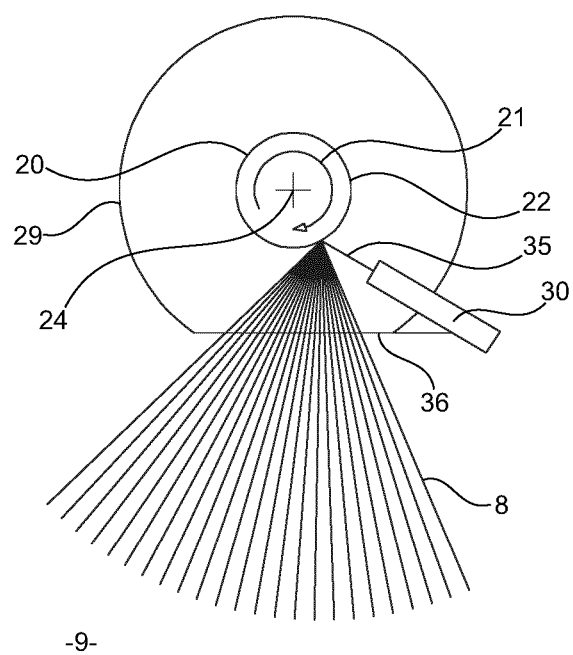
FIG. 6 is an overview of a second variant of an example rotating laser of one embodiment of the present disclosure.

FIG. 6 displays a further development of the disclosure, where a primary laser 30 directs a primary laser beam 35 onto a drum 20. This is surrounded by a panel 29, which protects the sensitive drum body from snow and ice and has a front opening 36 through which the laser beams 8 can be emitted into the surroundings 9. The drum 20 rotates around the axis 24 in the direction of arrow 21 and has a glass element 22 around its outer circumference in which several mirror elements are embedded. These mirror elements reflect the primary beam 35 at a specific angle and emit it as laser beams 8.

Figure 7:
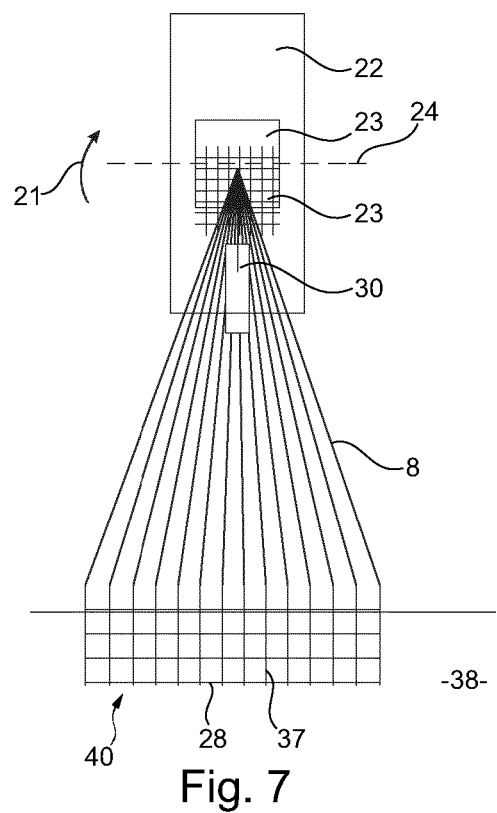
FIG. 7 is a side view of the second variant of the example rotating laser of one embodiment of the present disclosure.

According to FIG. 7, the glass element 22 has a surface that is cut in a way that an emitted primary laser beam 35 is reflected by the mirror element 23 embedded in the glass element 22 and is shaped in such a way that it emerges from the drum 20 with a cross-shaped structure. The laser beams 8 formed this way hit the ground 38, where the lattice-shaped structure becomes visible. The grid consists of the horizontal transverse lines 28, as well as the longitudinal lines 37 crossing the transverse lines 28.

Figure 8:
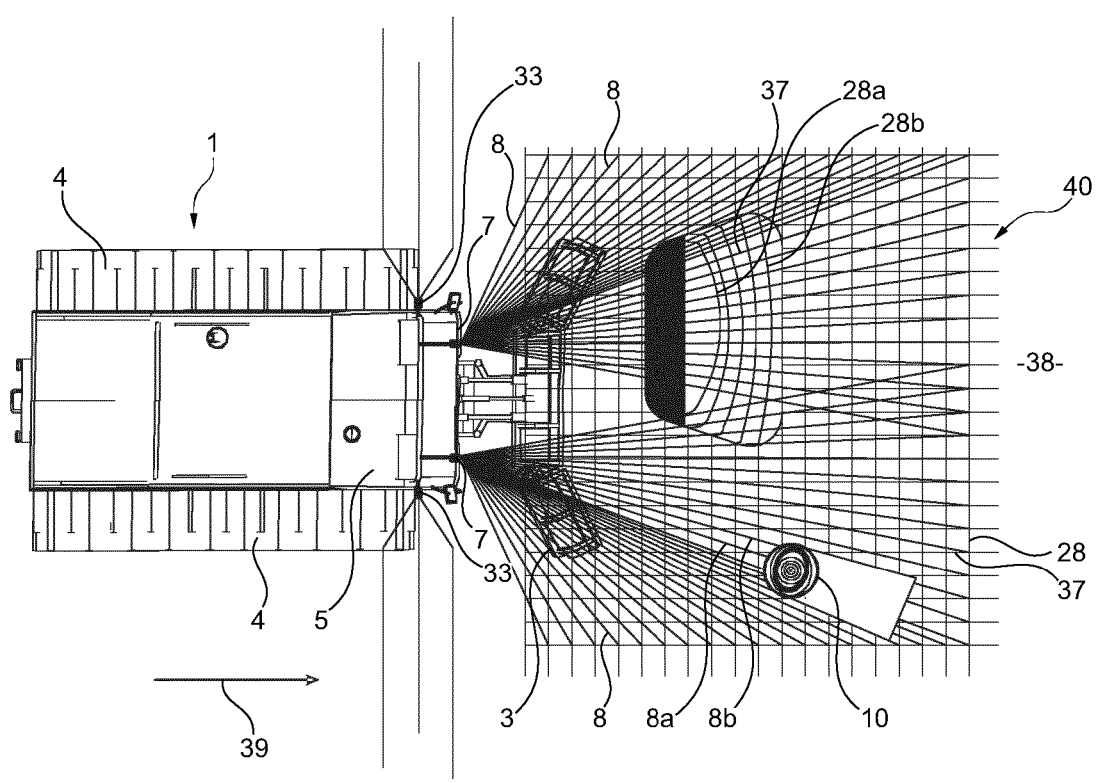
FIG. 8 is a top view of the example snow vehicle of the embodiment of the present disclosure.

FIG. 8 shows a top view of the snow vehicle 1. The snow vehicle 1 travels in the direction of movement 39 over the ground 38. Through the lasers 7 mounted on the roof of the driver's cab, snow vehicle 1 illuminates the ground 38. It should be appreciated that based on the special shape of the laser beams 8, a grid pattern 40 is projected onto the ground 38. The grid pattern 40 consists of the transverse lines 28 and the longitudinal lines 37 crossing the transverse lines 28.

When snow vehicle 1 reaches the trench 11, the grid pattern 40 that is projected in front of the snow vehicle is deformed, resulting in a spatial deformation of the transverse and longitudinal lines 28, 37. The driver of the snow vehicle can visually recognize such a spatial deformation, meaning that he or she can detect an obstacle or a topographical change on the ground 38.

Through the trench 11, the transverse lines 28 of the grid pattern 40 are represented as curved lines 28a, 28b, while the longitudinal lines 37 continue to hit the ground 38 straight. The different curvatures of the transverse lines 28a, 28b enable the driver to infer the depth and perimeter of the trench.

FIG. 8 displays another embodiment example where the laser beams 8 hit a three-dimensional object 10, shown here as a tree stump. The position of the object 10 in the beam direction of the laser beams 8 shortens the path of the laser beams 8 so that the shortened beams 8a, 8b hit the object. By changing the beam length and illuminating the object 10 via the laser beams 8a, 8b, the driver can detect the object and the size of the object 10 and perform a suitable maneuver to avoid the object.

In addition to the lasers 7, the side lasers 33 are located on the driver's cab 5, these lasers illuminating the side areas of the surrounding area 38 next to the snow vehicle 1.

Figure 9:
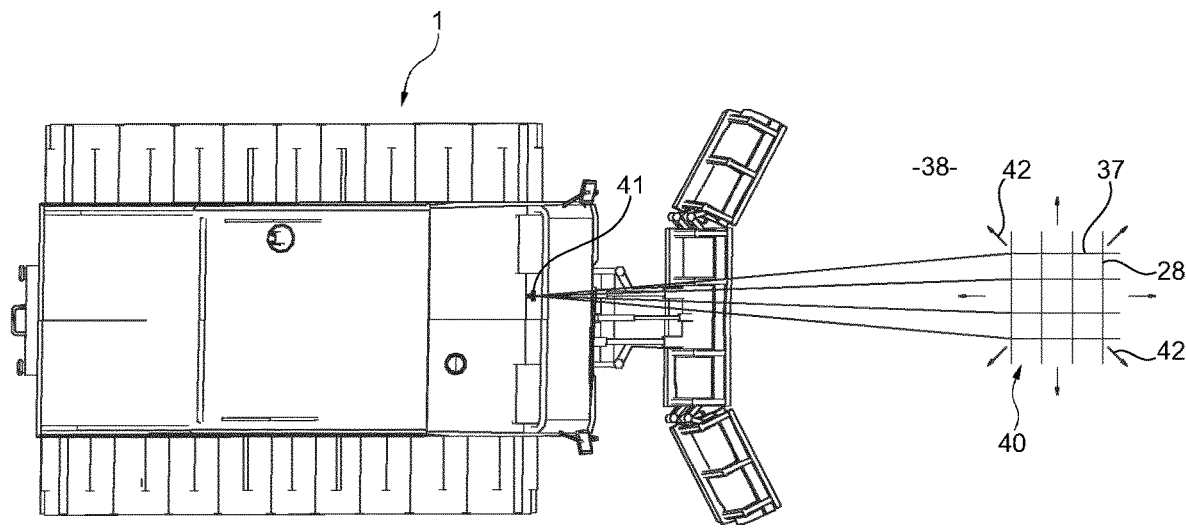
FIG. 9 is a top view of an example snow vehicle with a searchlight of one embodiment of the present disclosure.

FIG. 9 shows a snow vehicle 1 with a searchlight 41, which projects a narrowly defined grid pattern 40 onto the ground 38. The searchlight 41 is operated manually and can be turned and swiveled in all directions. In addition, the grid pattern 40 can be enlarged in the direction of arrow 42.

Figure 10:
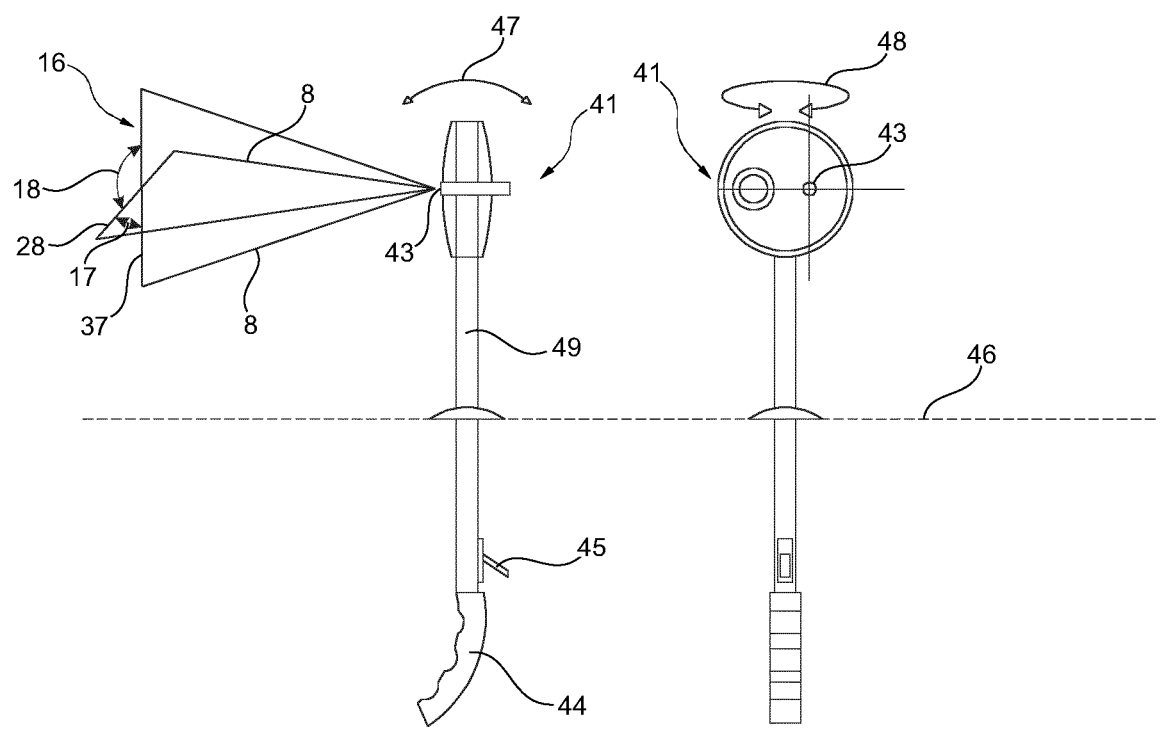
FIG. 10 are front and side views of an example searchlight of one embodiment of the present disclosure.

FIG. 10 shows side and front views of searchlight 41, which is mounted on a long, adjustable telescopic arm 49 and extends through the cabin's roof 46. The searchlight 41 can be operated via a handle 44 and can be adjusted in the swivel angle 47 and/or in the direction of rotation 48. A switch 45 can be used to switch the searchlight on and off, and to set the magnitude of the grid pattern.

The searchlight 41 is equipped with a photo laser diode 43 which creates a grid pattern. The cross-shaped structure 16 of the grid pattern consists of two intersecting, fan-shaped laser beams, which are at an angle 17, 18 to each other. In the example shown here, both angles 17, 18 are ninety degrees, so that two axes at right angles are emitted.

Figure 11:
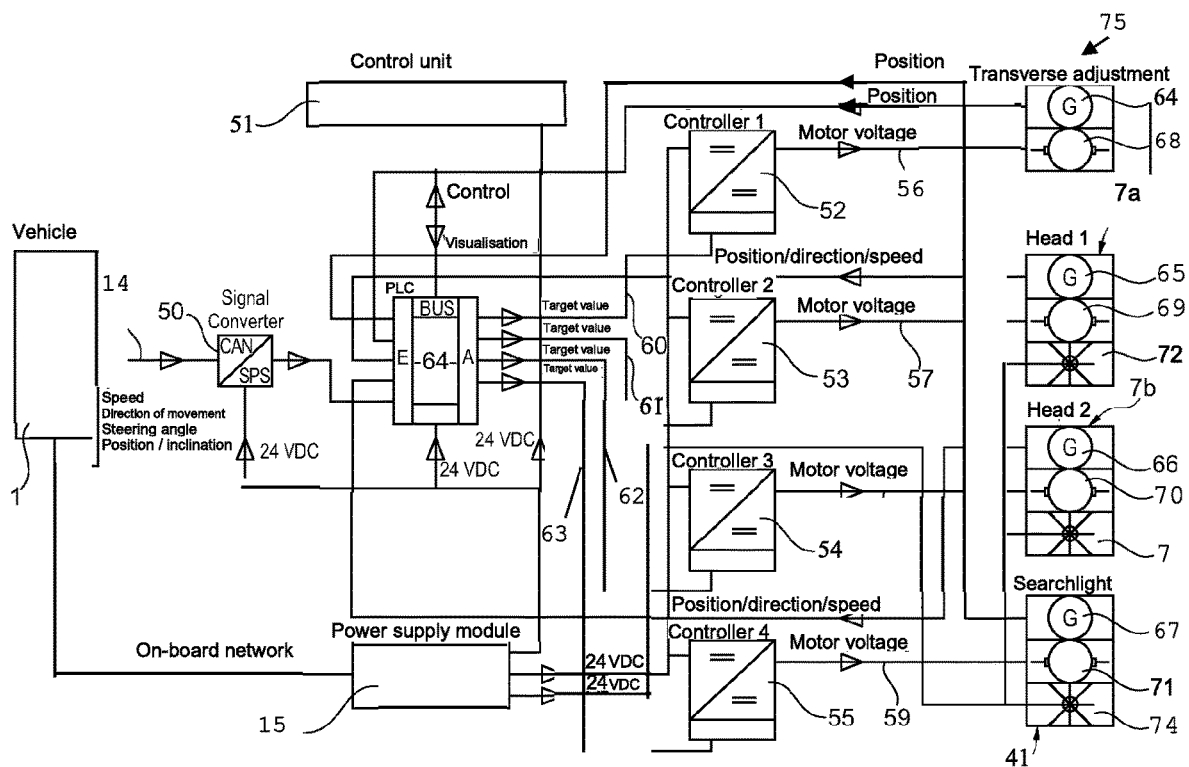
FIG. 11 is a block diagram of an example switch used for a snow vehicle.

FIG. 11 displays a block diagram of the switch used for the snow vehicle 1. A signal converter 50 converts the signals of the vehicle electronics (CAN BUS) into PLC-compatible signals. The signals 14 from snow vehicle 1, such as speed, direction of movement, steering angle, position, and inclination, are this way converted into PLC control signals. A PLC CPU 19 processes all input signals and performs all necessary calculations to subsequently issue the commands and output signals to the individual components. The PLC CPU 19 calculates the target values 60-63 from the fed in actual values and transmits them to the various controllers 52-55. The controllers 52-55 then use the motor voltages 56-59 to control the motor used to move the two lasers 7a, 7b or the searchlight 41. These parts each have a drive motor 68-71 (DC or AC gear motors, depending on requirements) with an assigned rotary encoder 64-67. A transverse adjustment 75 serves as a swivel motor for the deflections of the grid pattern system, so that the grid pattern that moves in the direction of movement does not collapse in the grid structure during a turn.

The rotary encoders 64-67 measure the position, speed and direction of the motors and can be used for various control tasks. They transmit signals that are processed by the PLC CPU 19. Depending on the type of encoder used (impulses, sine waves, voltage, etc.), different control systems can be implemented.

For example, if the snow vehicle accelerates, the projection units 72-74 of the lasers 7a, 7b or the searchlight 41 are controlled in such a way that the grid pattern 40 moves towards the snow vehicle 1 at a relative speed. The driver of the vehicle therefore has the impression that he or she is driving over the grid pattern. If the snow vehicle slows down, the relative speed of the grid pattern is also reduced.

The advantage of generating a dynamic grid pattern is that the generated grid pattern is projected in a stable manner onto the surface to be driven over, irrespective of vehicle oscillations and rolling movements.

To control the laser, for example, the rotation speed of drums 20 and 25 can be adjusted, as displayed in FIGS. 5 and 6.

The entire system is controlled by a control unit 51 from which all adjustable parameters can be selected, changed, and visualised (displayed).

A power supply module 15 is used to supply power to all components.

Lastly, it is clear that modifications and variations may be made to the disclosure described herein without departing from the scope of the appended claims and without diminishing its intended technical scope. That is, various changes and modifications to the present embodiments described herein will be apparent to those skilled in the art and it is therefore intended that such changes and modifications be covered by the appended claims.

The invention claimed is:

1. A snow groomer configured to maintain at least one of ski slopes and cross-country ski trails, the snow groomer comprising:
at least one lighting element comprising a plurality of lasers mounted on a rotatable drum body on a side of the snow groomer and configured to self-level via a gyroscope sensor, the plurality of lasers configured to emit a plurality of laser beams through a plurality of different lenses to project a pattern having a structure on the ground of the surroundings of the snow groomer, wherein the pattern is configured to be distorted in a visually detectable manner on at least one of an obstacle of the surroundings of the snow groomer and a topographical condition of the surroundings of the snow groomer.

2. The snow groomer of claim 1, wherein the visually detectable manner comprises an object-related optical recognition of the surroundings of the snow groomer.

3. The snow groomer of claim 1, further comprising a gyroscope configured to determine a current location of the snow groomer via detecting changes in direction in conjunction with measuring distances.

4. The snow groomer of claim 1, wherein the pattern having the structure on the ground of the surroundings of the snow groomer is controlled as a function of at least one of: a driving speed, a steering angle, a selected gear, and an inertial sensor configured to detect an inclination of the snow groomer.

5. The snow groomer of claim 1, wherein at least one of the lenses is configured to optically transform at least one of the laser beams such that that laser beam generates the pattern directed towards the ground from the mounted position on the snow groomer.

6. The snow groomer of claim 1, wherein the structure of the pattern comprises one of: a grid structure, a point structure, a circular structure and a line structure.

7. The snow groomer of claim 1, wherein the at least one lighting element comprises a side laser configured to project an additional structure onto the ground beside the snow groomer, wherein the side laser is mounted on one of a side of a cabin of the snow groomer and a top of the cabin of the snow groomer.

8. The snow groomer of claim 1, wherein at least one of the lenses is configured to emit a horizontal line pattern and at least one of the lenses is configured to emit a vertical line pattern.

9. The snow groomer of claim 1, wherein at least one of the lasers is mounted on an extendable and retractable telescopic arm.

10. The snow groomer of claim 9, wherein the extendable and retractable telescopic arm is one of electrically controlled and controlled by an electric motorized actuator.

11. A lighting element configured to be coupled to a snow groomer, the lighting element comprising:
a plurality of lasers mountable on a rotatable drum body on a side of the snow groomer and configured to emit a plurality of laser beams through a plurality of different lenses to project a pattern having a structure on the ground of the surroundings of the snow groomer, wherein the pattern is configured to be distorted in a visually detectable manner on at least one of an obstacle of the surroundings of the snow groomer and a topographical condition of the surroundings of the snow groomer, and
a gyroscope configured cause a self-levelling of the laser.

12. The lighting element of claim 11, wherein the visually detectable manner comprises an object-related optical recognition of the surroundings of the snow groomer.

13. The lighting element of claim 11, wherein at least one of the lenses is configured to optically transform at least one of the laser beams such that that laser beam generates the pattern directed towards the ground from the mounted position on the snow groomer.

14. The lighting element of claim 11, wherein the structure of the pattern comprises one of: a grid structure, a point structure, a circular structure and a line structure.

15. The lighting element of claim 11, further comprising a side laser configured to project an additional structure onto the ground beside the snow groomer, wherein the side laser is mountable on one of a side of a cabin of the snow groomer and a top of the cabin of the snow groomer.

16. The lighting element of claim 11, wherein at least one of the lenses is configured to emit a horizontal line pattern and at least one of the lenses is configured to emit a vertical line pattern.

17. The lighting element of claim 11, wherein at least one of the lasers is mountable on an extendable and retractable telescopic arm.

18. The lighting element of claim 17, wherein the extendable and retractable telescopic arm is one of electrically controlled and controlled by an electric motorized actuator.

19. A snow groomer configured to maintain at least one of ski slopes and cross-country ski trails, the snow groomer comprising:
at least one lighting element comprising:
a laser configured to self-level via a gyroscope sensor, the laser configured to emit a laser beam configured to project a pattern having a structure on the ground of the surroundings of the snow groomer, wherein the pattern is configured to be distorted in a visually detectable manner on at least one of an obstacle of the surroundings of the snow groomer and a topographical condition of the surroundings of the snow groomer, and
a glass element in which a plurality of mirror elements are embedded and arranged on an outer circumference of a rotatable drum body, the mirror elements configured to reflect the laser beam.

20. The snow groomer of claim 19, wherein the glass element comprises a cut on a surface that enables a reflected laser beam to be formed such that the reflected laser beam emerges from the rotatable drum body with a cross-shaped structure.

21. A lighting element configured to be coupled to a snow groomer, the lighting element comprising:
a laser configured to emit a laser beam configured to project a pattern having a structure on the ground of the surroundings of the snow groomer, wherein the pattern is configured to be distorted in a visually detectable manner on at least one of an obstacle of the surroundings of the snow groomer and a topographical condition of the surroundings of the snow groomer, and
a gyroscope configured cause a self-levelling of the laser, and
a glass element in which a plurality of mirror elements are embedded and arranged on an outer circumference of a rotatable drum body, the mirror elements configured to reflect the laser beam.

22. The lighting element of claim 21, wherein the glass element comprises a cut on a surface that enables a reflected laser beam to be formed such that the reflected laser beam emerges from the rotatable drum body with a cross-shaped structure.

* * * * *